(12) United States Patent
Vicik

(10) Patent No.: US 9,381,129 B1
(45) Date of Patent: Jul. 5, 2016

(54) EXTERNAL FIXATOR LEG ASSIST APPARATUS

(71) Applicant: David Vicik, Des Plaines, IL (US)

(72) Inventor: David Vicik, Des Plaines, IL (US)

(*) Notice: Subject to any disclaimer, the term of this patent is extended or adjusted under 35 U.S.C. 154(b) by 54 days.

(21) Appl. No.: 14/313,396

(22) Filed: Jun. 24, 2014

Related U.S. Application Data

(60) Provisional application No. 61/923,012, filed on Jan. 2, 2014.

(51) Int. Cl.
| | | |
|---|---|---|
| *A61G 13/12* | (2006.01) | |
| *F16M 11/10* | (2006.01) | |
| *A47C 16/02* | (2006.01) | |
| *A47C 20/00* | (2006.01) | |

(52) U.S. Cl.
CPC ............ *A61G 13/1245* (2013.01); *A47C 16/02* (2013.01); *A47C 16/025* (2013.01); *A47C 20/021* (2013.01); *A61G 13/125* (2013.01); *A61G 13/1205* (2013.01); *F16M 11/10* (2013.01)

(58) Field of Classification Search
CPC .............. A61G 13/12; A61G 13/1205; A61G 13/1235; A61G 13/124; A61G 13/1245; A61G 13/125; A47C 16/02; A47C 16/025; A47C 20/021; A47C 20/023; F16M 11/10
USPC ................... 211/182; 248/127, 128, 146, 151
See application file for complete search history.

(56) References Cited

U.S. PATENT DOCUMENTS

| | | | | |
|---|---|---|---|---|
| 591,099 | A * | 10/1897 | Harbaugh ........................... | 5/634 |
| 1,619,685 | A * | 3/1927 | Updegrove et al. ................ | 5/648 |
| 2,764,150 | A * | 9/1956 | Ettinger et al. ................... | 602/39 |
| 3,065,992 | A * | 11/1962 | Nagel ....................... | 297/423.46 |
| 3,066,322 | A * | 12/1962 | Derby ................................ | 5/651 |
| 3,237,215 | A * | 3/1966 | Fried ................................. | 5/632 |
| 3,264,033 | A * | 8/1966 | Hansburg ................. | 297/423.39 |
| 3,716,067 | A * | 2/1973 | Skoog ............................ | 135/67 |
| 3,753,557 | A * | 8/1973 | Kelley .............................. | 5/648 |
| 4,296,694 | A * | 10/1981 | Kobayashi .................... | 108/116 |
| 4,328,992 | A * | 5/1982 | Ohanian ................... | 297/423.44 |
| 4,536,032 | A * | 8/1985 | Highberger .............. | 297/423.41 |
| 4,763,865 | A * | 8/1988 | Danner ......................... | 248/164 |
| 4,953,540 | A * | 9/1990 | Ray et al. ...................... | 600/233 |
| 5,024,407 | A * | 6/1991 | Bartley ........................ | 248/164 |
| 5,111,808 | A * | 5/1992 | Meals ............................ | 602/23 |
| 5,146,635 | A * | 9/1992 | Gastle et al. ..................... | 5/620 |
| 5,287,643 | A * | 2/1994 | Arizpe-Gilmore ............... | 42/94 |
| 5,483,901 | A * | 1/1996 | Tisbo et al. .................... | 108/119 |
| 5,536,072 | A * | 7/1996 | Chang ...................... | 297/423.45 |
| 5,857,649 | A * | 1/1999 | Eason ........................... | 248/164 |

(Continued)

FOREIGN PATENT DOCUMENTS

WO 2010083554 A1 7/2010

*Primary Examiner* — Nicholas Polito
*Assistant Examiner* — David R Hare
(74) *Attorney, Agent, or Firm* — Robert C. Montgomery; Montgomery Patent & Design, LLC

(57) ABSTRACT

An external fixator leg assist apparatus utilizes a rigid frame structure having a base and a support. The base comprises a two-prong shaft mechanism in pivotal connection with the support. The support is a similar shaft mechanism. The apparatus is placed on a table or other flat surface with the base abutting a top surface of the table. The medical fixator is placed on top or inside the support portion of the apparatus. The apparatus assists a medical professional in keeping the appendage of the patient steady while attempting to install, adjust, or remove the fixator.

11 Claims, 3 Drawing Sheets

(56) References Cited

U.S. PATENT DOCUMENTS

| | | | |
|---|---|---|---|
| 6,014,827 A * | 1/2000 | Lehrman | 38/104 |
| 6,026,812 A * | 2/2000 | Lipson et al. | 128/882 |
| 6,231,015 B1 * | 5/2001 | Kun | 248/164 |
| 6,295,987 B1 * | 10/2001 | Parker et al. | 128/845 |
| 6,334,593 B2 * | 1/2002 | Inoue | 248/95 |
| 6,438,777 B1 * | 8/2002 | Bender | 5/630 |
| 6,874,184 B2 * | 4/2005 | Chandler | 5/648 |
| 6,912,961 B2 * | 7/2005 | Winter et al. | 108/118 |
| 7,422,593 B2 | 9/2008 | Cresina et al. | |
| 7,753,610 B2 * | 7/2010 | Gehrke | 403/109.3 |
| 7,955,333 B2 | 6/2011 | Yeager | |
| 8,323,282 B2 | 12/2012 | Taylor | |
| 8,572,781 B2 * | 11/2013 | Schlanger et al. | 5/648 |
| 2003/0078144 A1 * | 4/2003 | Gehrke | 482/140 |
| 2005/0155153 A1 * | 7/2005 | Falwell | 5/646 |
| 2006/0272893 A1 * | 12/2006 | Foggio et al. | 182/69.1 |
| 2008/0132817 A1 | 6/2008 | Vito | |
| 2009/0275944 A1 | 11/2009 | Huebner et al. | |
| 2010/0324584 A1 | 12/2010 | Shaw | |
| 2010/0324665 A1 | 12/2010 | Shaw et al. | |
| 2011/0127390 A1 | 6/2011 | Brown | |
| 2012/0078251 A1 | 3/2012 | Benenati et al. | |
| 2012/0324650 A1 * | 12/2012 | Russell | 5/648 |

\* cited by examiner

EXTERNAL FIXATOR LEG ASSIST APPARATUS

RELATED APPLICATIONS

The present invention was first described in and claims the benefit of U.S. Provisional Application No. 61/923,012, filed Jan. 2, 2014, the entire disclosures of which are incorporated herein by reference.

FIELD OF THE INVENTION

The present invention relates generally to a support apparatus for an appendage of a patient during removal of an external fixator.

BACKGROUND OF THE INVENTION

External fixators are often used as a method of immobilizing leg and other limb bones to allow a fracture to heal. These devices utilize pins or screws that are placed into the bone on all sides of the fracture. The pins and screws are then secured together outside the skin with clamps and rods within an external skeletal frame. As the bones mend back together, the external fixator can be adjusted such that the bones remain in an optimal position during the healing process. While fixators perform their intended function very well, such devices are difficult to install, adjust, and remove while the bone mending process is being conducted or has been completed. A typical process requires two (2) or more people to support the user's appendage while installing, adjusting, or removing the various pins and screws. Furthermore, the patient is often extremely uncomfortable due to the adverse pressure placed upon the appendage, as well as the difficulty of holding the appendage in place in an elevated position for a long period of time. Accordingly, there exists a need for a means by which an external fixator upon a patient's appendage may be supported for easy installation, adjustment, or removal in order to avoid the problems as described above. The development of the apparatus fulfills this need.

The apparatus of the present invention is an aid to assist in the installation, adjustment, and removal of an external fixator that has been placed on patient's leg or other limb. The apparatus is an adjustable "X"-shaped support frame forming a holding cradle for supporting a user's appendage in an elevated position. In a fixator removal situation for example, the apparatus is slid along the user's appendage from an upper portion of the fixator, nearest a user's torso. In such a position, the apparatus provides support for the user's appendage while supporting the appendage and fixator in an elevated position. The apparatus is adjustable in height, width, and length, and is provided with friction pads to add to the stability of the apparatus during use.

Prior art in this field consists of fixators that have supporting configurations, but these supporting configurations assist with ambulatory functions of the appendage while the fixator is attached, as opposed to supporting the fixators in an elevated position while installing, adjusting, or removing the fixator. Other prior art are supplemental supports for fixators, but again these are configured to assist with ambulatory functions of the appendage while the fixator is attached to an appendage. Other related prior art consists of articulating appendage supports that provide a means to hold an appendage aloft while performing work functions in non-salutary and compromising positions, such as operating on a patient for hours or performing mechanical work on an elevated object while lying on one's back.

It is an objective of the present invention to provide a scaffold to support an appendage having a fixator attached thereto in an elevated position so that installation, adjustment, or removal of the fixator can be accomplished in a more efficient and effective manner by a single medical professional and with minimal discomfort experienced by a person having the fixator.

It is a further objective of the present invention to provide a low-profile configuration of the scaffold so as to minimally interfere with the installation, adjustment, or removal process of the fixator.

It is a further objective of the present invention to have this scaffold adjustable so as to provide optimal support.

It is a further objective of the present invention to provide friction surfaces to a bottom portion of the scaffold to obviate inadvertent movement.

SUMMARY OF THE INVENTION

The apparatus of the present invention is an appendage support device that is used to support a user's limb, having a fixator attached thereto, in an elevated position while undergoing a procedure to install, adjust, or remove the fixator. The apparatus comprises a scaffold having a configuration of a pivotally connected "X"-shaped structure. The "X"-shaped structure comprises two (2) "U"-shaped members pivotally attached, where each "U"-shaped member provides two (2) horizontal leg portions. There are two (2) lower legs forming the base of the apparatus, and two (2) upper legs forming the cradled support of the apparatus. The lower legs are further provided with friction pads to assist with stabilization of the apparatus while in use.

A width adjustment mechanism is provided and connected to the lower legs to provide with adjustment and securement of the legs, thereby enabling varying the width of the spatial volume defined between the upper legs, as well as the lower legs. This width adjustment mechanism also provides a means to vary the height of the apparatus. Each upper leg portion is further provided with length adjustment mechanisms that comprise tube extensions located at distal ends of each leg. The apparatus presents a low-profile configuration that does not interfere with the installation, adjustment, or removal process of the fixator. During installation, adjustment, or removal of the fixator, a user's appendage remains comfortably supported by the apparatus, while affording the performance the work of installation, adjustment, or removal to be conducted by one (1) person.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
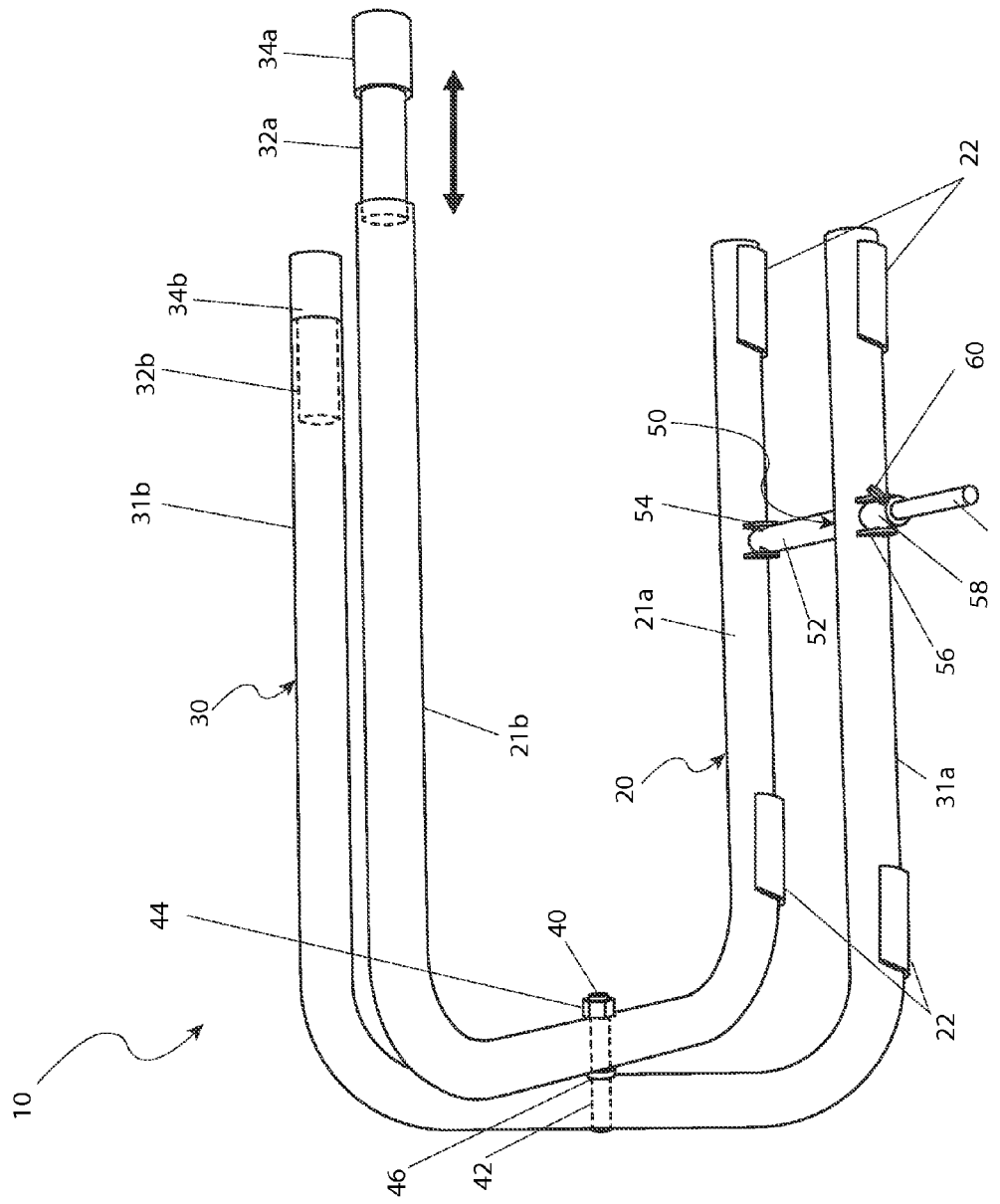
FIG. 1 is a front perspective view of a limb support apparatus for an external fixator 10, according to a preferred embodiment of the present invention.

DESCRIPTIVE KEY 10 limb support apparatus for an external fixator
20 first tubular member
21a first lower leg
21b first upper leg
22 friction device
30 second tubular member
31a second lower leg
31b second upper leg
32a first extension tube
32b second extension tube
34a first extension tube cap
34b second extension tube cap
40 pivot fastener
42 fastener aperture
44 nut fastener
46 spacer
50 adjusting assembly
52 rod
53 aperture
54 first bracket
55 first pin
56 second bracket
57 second pin
58 clamp cylinder
60 thumb screw
90 fixator
100 limb
105 foot

DETAILED DESCRIPTION OF THE PREFERRED EMBODIMENT

Figure 2:
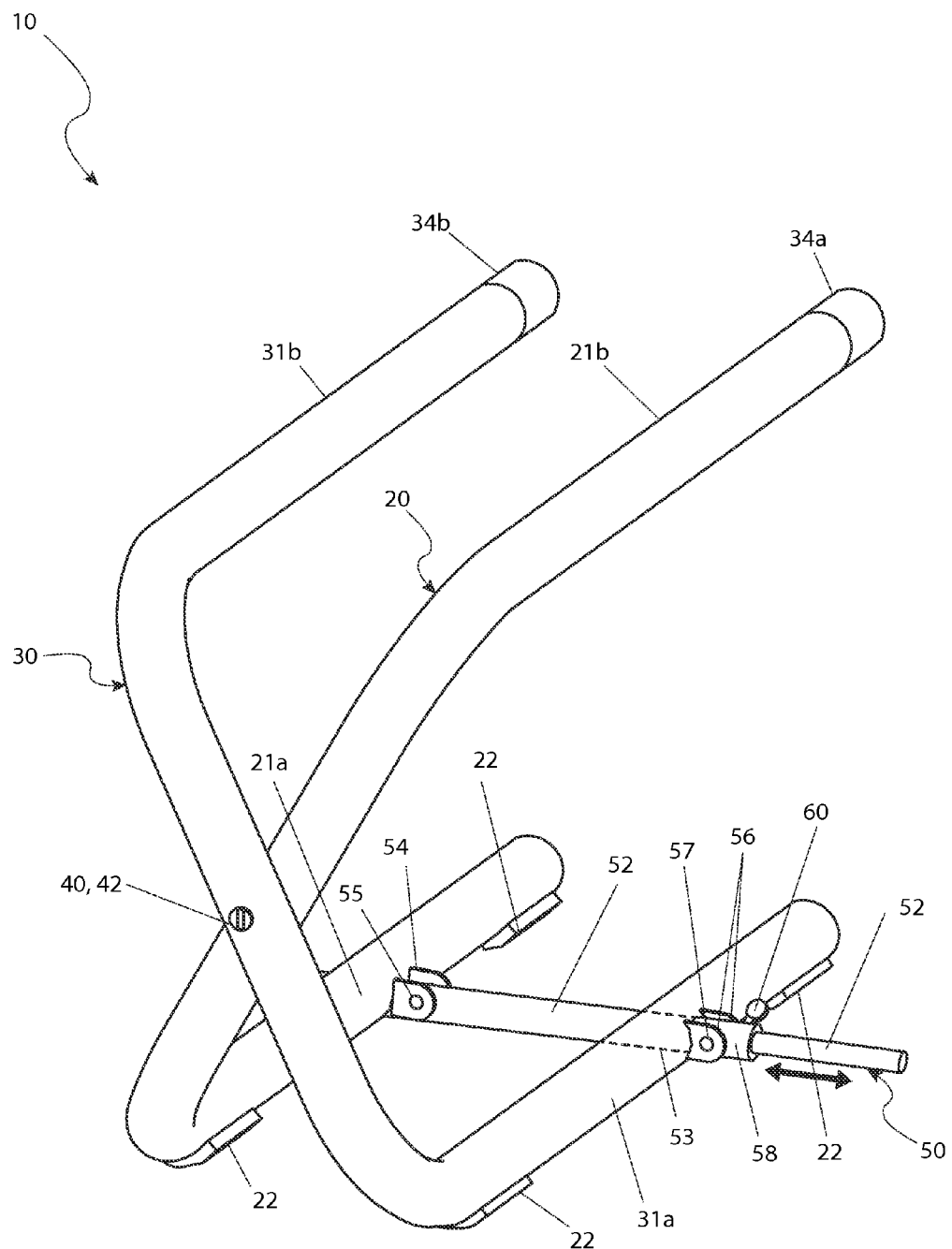
FIG. 2 is an end perspective view of the limb support apparatus for an external fixator 10, according to a preferred embodiment of the present invention; and, FIG. 3 is an environmental view of the limb support apparatus for an external fixator 10 depicting an in-use state upon a limb 100, according to a preferred embodiment of the present invention
Figure 3:
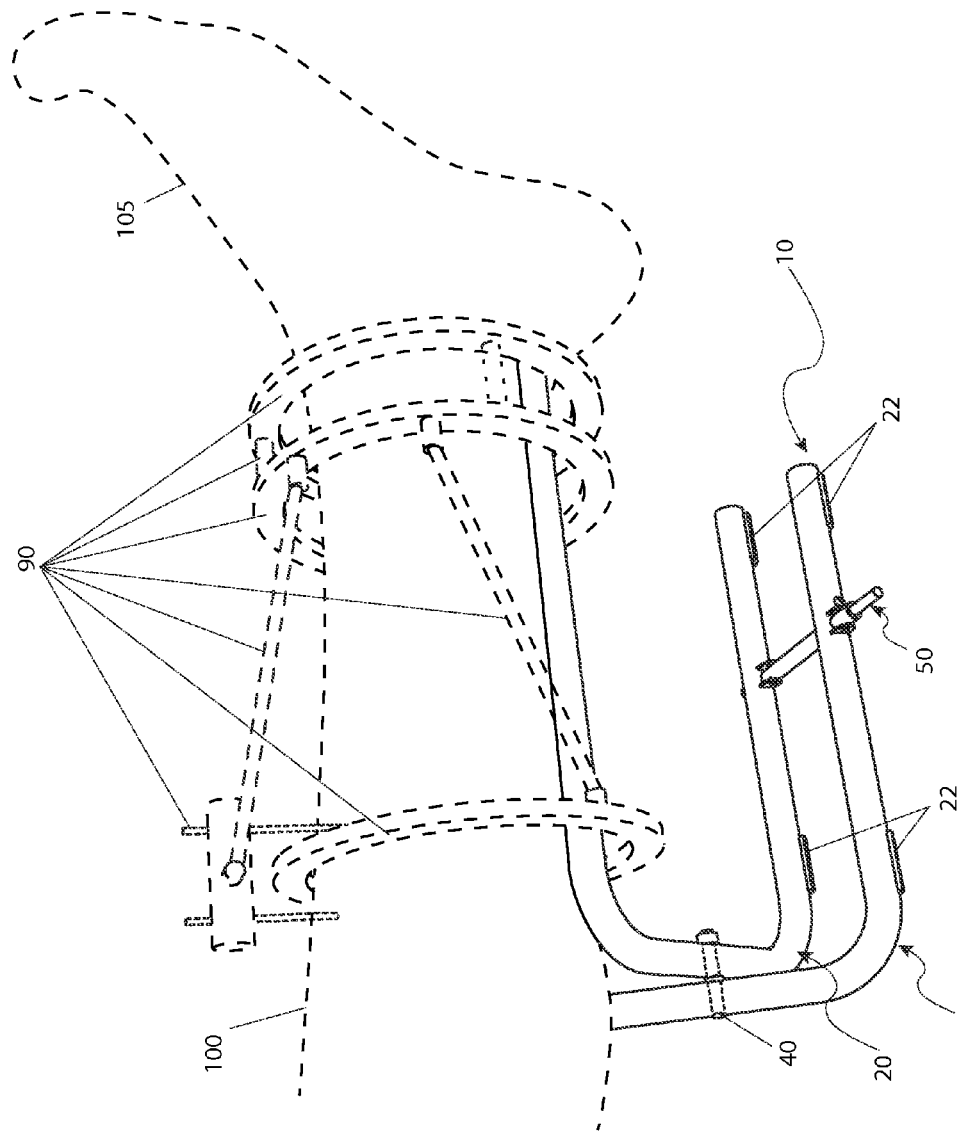

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a limb support apparatus 10 for an external fixator 90 (herein described as the "apparatus") 10, configured to provide an aid to assist in procedures associated with the application of an external fixator 90 upon a patient's injured limb 100. The apparatus 10 is depicted herein being applied to a lower leg portion for illustration sake. The apparatus 10 provides support for the user's injured limb 100 so as to position a mounted external fixator 90 above a surface of a medical exam table or other subjacent surface.

The apparatus 10 is envisioned being introduced in various sizes for use on different sizes of limbs 100 and portions of limbs 100 such as an upper leg, a lower leg, an ankle, an arm, a wrist, and the like. Such positioning of the limb 100 reduces undesirable movement during installation and removal of the fixator 90; enables removal of the fixator 90 by one (1) person; and, aids in the removal of pins and screws associated with the fixator 90.

Referring now to FIGS. 1 and 2, front and end perspective views of the apparatus 10, according to a preferred embodiment of the present invention, are disclosed. The apparatus 10 provides a tubular "X"-shaped structure including pivotingly connected first tubular member 20 and a second tubular member 30 portions. The tubular members 20, 30 are envisioned being made using a suitable metal material such as polished stainless steel or the like. Additionally, it is envisioned that a disposable version of the apparatus 10 may be constructed using plastic portions of sufficient strength to bear a load from a patient's limb 100. Each tubular member 20, 30 comprises a "U"-shaped form with extending leg portions 21a, 21b, 31a, 31b being positioned at a horizontal orientation. The tubular members 20, 30 are pivotally attached to each other via a pivot fastener 40, such as a shoulder bolt, which passes through respective web portions along proximal ends of the "U"-shaped tubular members 20, 30. The tubular members 20, 30 include respective first lower leg 21a and second lower leg 31a portions, which act as a base while the apparatus 10 is resting upon a flat surface. The tubular members 20, 30 also include respective, and first upper leg 21b and second upper leg 31b portions, which cradle and support a user's limb 100 (a leg shown here), at an elevated position. The legs 21a, 21b, 31a, 31b extend in a parallel manner having cantilevered distal end portions, thereby allowing controlled installation and removal of the external fixator 90 (see FIG. 3). The pivot fastener 40 is envisioned to pass through aperture portions 42 of the tubular members 20, 30 and engage a nut fastener 44, or equivalent securing means. The pivot fastener 40 also passes through a spacer 46 such as a nylon or TEFLON® washer being positioned between the first tubular member 20 and second tubular member 30. The spacer 46 is intended to protect said members 20, 30 from possible damage resulting from relative movement during adjustment and/or use.

The lower legs 21a, 31a further provide a plurality of preferably rectangular friction pads 22 being adhesively or otherwise affixed along bottom surfaces to stabilize the apparatus 10 when placed upon a flat surface. Additionally, the lower legs 21a, 31a are adjustably connected to each other at distal end portions by a width adjusting assembly 50 which provides a means to adjust and lock a distance between the lower legs 21a, 31a, and consequently between the corresponding upper 21b, 31b leg portions as well. Adjustment of the distance between the lower 21a, 31a and upper 21b, 31b legs enables the apparatus 10 to be selectively configured and positioned against a user's limb 100, as well as conforming to variously configured fixators 90 (see FIG. 3).

The adjusting assembly 50 includes first bracket 54 and second bracket 56 portions being permanently affixed to respective first lower 21a and second lower 31a legs. The brackets 54, 56 comprise "U"-shaped fixtures having perpendicularly extending side surfaces. The first bracket 54 provides a pivoting and anchoring means to a rod portion 52 via a first pin 55. The rod 52 in turn passes through an aperture portion 53 of the second lower leg 31a and is subsequently clamped in a selective manner along its length via a clamp cylinder 58, which is pivotally affixed to the aforementioned second bracket 56 via a second pin 57. The clamping cylinder 58 comprises a hollow cylindrical construction having a center opening portion being sized to enable the rod 52 to be slidingly motioned within, thereby obtaining a desired distance between the first lower leg 21a and the second lower leg 31a. The clamping cylinder 58 further includes a threaded thumb screw 60, which threadingly engages a side portion of the clamping cylinder 58, and in turn impinges and secures the rod 52 in position.

An embodiment of the apparatus 10 is shown here being approximately ten to twelve inches (10-12 in.) in length, five inches (5 in.) in width, and five inches (5 in.) in height; however, it is understood that the apparatus 10 may be introduced in other sizes for utilization with different sizes and models of external fixators 90 upon various user limbs 100.

Each upper leg portion 21b, 31b of the apparatus 10 provides a length-adjusting means via respective first extension tube 32a and second extension tube 32b portions which are inserted into open distal end portions of the upper legs 21b, 31b in a telescoping manner. The extension tubes 32a, 32b further provide integral first extension tube cap 34a and second extension tube cap 34b portions, respectively. The tube caps 34a, 34b have a equal, or larger, outer diameter as the legs 21b, 31b, thereby acting as a mechanical stopping means when the extension tubes 32a, 32b are fully inserted to a stowed position. Lengthening the upper legs 21b, 31b using the extension tubes 32a, 32b, enables quick configuration of the apparatus 10 for use on variously sized limbs 100.

Referring now to FIG. 3, an environmental view of the apparatus 10 depicting an in-use state upon a limb 100, according to the preferred embodiment of the present invention, is disclosed. The apparatus 10 consists of a pair of upper leg portions 21b, 31b which may be installed while the fixator 90 is in position upon the limb 100 (a leg shown here). The upper leg portions 21b, 31b of the apparatus 10 are to be slid along the bottom surface of the user's limb 100 starting from the user's knee area. In such a position, the apparatus 10 provides support for the user's limb 100 while holding the fixator 90 up off of the medical exam table. The apparatus 10 presents a low-profile design that does not interfere with the installation or removal process, as well as the removal of pins and screws. To remove the fixator 90, following removal of all pins and screw portions, remaining portions of the external fixator 90 are simply slid downward over the user's foot 105 while the leg remains comfortably supported by the apparatus 10. These features allow external fixators 90 to be removed by only one (1) person, while ensuring that the user's limb 100 is comfortably supported throughout the entire process.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by qualified medical personnel in a simple manner with little or no training. After initial purchase or acquisition of the apparatus 10, it would be installed as indicated in FIG. 3.

The method of utilizing the apparatus 10 to enable one (1) person to remove a fixator 90 from a patient's limb 100 may be achieved by performing the following steps: procuring a model of the apparatus 10 being made of a desired material and being particularly sized to support a user's limb 100 or limb portion being treated; lifting the patient's limb 100 in a manual fashion slightly above a flat surface of an examination table or the like such that the portions of the external fixator 90 are positioned above the examination table; sliding the upper leg portions 21b, 31b of the apparatus 10 along a bottom surface of the user's limb 100 starting from the upper portion nearest the user's knee while coincidentally inserting the upper leg portions 21b, 31b through any spatial rings, struts, or other portions of the fixator 90; adjusting a distance between the upper legs 21b, 31b as necessary to comfortably support the limb 100 and to obtain clearance from the portions of the fixator 90 by loosening the thumb screw 60; sliding the rod 52 within the clamp cylinder 58 until obtaining a desired position of the upper legs 21b, 31b; tightening the thumb screw 60; resting the limb 100 upon the upper legs 21b, 31b to provide support for the user's limb 100; removing all pins, screws, and other attachment portions of the fixator 90 in a normal manner; removing the external fixator 90 from the limb 100 by sliding the remaining portions of the fixator 90 downward over the user's limb 100 while the limb 100 remains comfortably supported by the apparatus 10; and, benefiting from reduction of undesirable movement of a patient's limb 100 during removal of an external fixator 90 afforded a user of the present invention 10.

Although the use of the apparatus 10 is shown and described by inserting the upper leg portions 21b, 31b through any spatial rings, struts, or other portions of the fixator 90, it is understood that the fixator 90 may also be simply rested upon the upper leg portions 21b, 31b so that they cradle the fixator 90, if such a situation provides better or more convenient support.

It is further envisioned that a soft fabric covering or pad may be applied to the upper leg portions 21b, 31b during use to provide additional comfort and protection to the patient's limb 100.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An appendage support apparatus, comprising a framework, comprising:
   a first "U"-shaped member has a first lower cantilever leg and a first upper cantilever leg;
   a second "U"-shaped member has a second lower cantilever leg and a second upper cantilever leg;
   said first lower cantilever leg and said second lower cantilever leg forming a base portion;
   said first upper cantilever leg and said second upper cantilever leg forming a cradle portion;
   a pivot connection pivotally securing said first "U"-shaped member to said second "U"-shaped member, said pivot connection provides for a connection of said first "U"-shaped member and said second "U"-shaped member so as to form an "X"-shape formation and enable a scissor actuation between first "U"-shaped member and said second "U"-shaped member;
   a length adjustment means to selectively extend and retract at least one cantilever leg; and,
   a width and height adjustment means to incrementally modify a spatial distance between each cantilever leg and secure said cantilever legs in a fixed position having a desired spatial distance therebetween, comprising:
      a first bracket affixed to said first lower cantilever leg and configured to pivotally connect a rod thereto;

a second bracket affixed to said second lower cantilever leg and configured to permit said rod to extend therethrough;

a clamp cylinder having a threaded aperture and pivotally affixed to said second bracket and configured to enable said rod to extend through a portion thereof; and, a threaded thumb screw configured to threadingly engage with said threaded aperture;

wherein said base portion is configured to support said framework on a flat surface; and, wherein said cradle portion is configured to support a human appendage having a fixator attached thereto;

wherein said second lower cantilever leg is provided with a rod aperture located at a position where said second bracket is affixed;

wherein said rod is configured to extend through said second bracket and said rod aperture; and, wherein said clamp cylinder and said threaded thumb screw are configured to mechanically engage said rod as said thumb screw is advanced through said clamp cylinder.

2. The apparatus recited in claim 1, wherein said framework is metal.

3. The apparatus recited in claim 1, wherein said framework is plastic.

4. The apparatus recited in claim 1, further comprising a spacer disposed between said first "U"-shaped member and said second "U"-shaped member.

5. The apparatus recited in claim 4, wherein said spacer is a TEFLON® washer.

6. The apparatus recited in claim 4, wherein said spacer is a nylon washer.

7. The apparatus recited in claim 1, further comprising at least one friction pad affixed to a bottom surface of at least one of said first lower cantilever leg and said second cantilever leg.

8. The apparatus recited in claim 1, wherein at least one distal end of a cantilever leg is provided with a hollow construction.

9. The apparatus recited in claim 8, wherein said length adjustment means comprises at least one extension tube configured to slidably insert into a distal end of a cantilever leg having said hollow construction.

10. The apparatus recited in claim 9, further comprising a cap disposed on each extension tube.

11. The apparatus recited in claim 10, wherein each cap is provided with a diameter at least equal to an outer diameter of said cantilever leg having said hollow construction.

* * * * *